(12) United States Patent
Cho et al.

(10) Patent No.: US 7,933,131 B2
(45) Date of Patent: Apr. 26, 2011

(54) POWER SUPPLY AND IMAGE FORMING DEVICE HAVING THE SAME

(75) Inventors: Jun-seok Cho, Gwangmyeong-si (KR); Sang-yong Han, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 859 days.

(21) Appl. No.: 11/686,422

(22) Filed: Mar. 15, 2007

(65) Prior Publication Data

US 2008/0024092 A1    Jan. 31, 2008

(30) Foreign Application Priority Data

Jul. 28, 2006   (KR) .......................... 10-2006-0071768

(51) Int. Cl.
   *H02M 3/335*   (2006.01)
(52) U.S. Cl. ........... 363/21.12; 363/18; 363/20; 307/11; 323/267
(58) Field of Classification Search .................. 323/207, 323/247, 262, 266, 267, 268, 271, 282; 363/15, 363/17, 18, 20; 307/11, 17
   See application file for complete search history.

(56) References Cited

U.S. PATENT DOCUMENTS

| | | | |
|---|---|---|---|
| 5,812,383 A * | 9/1998 | Majid et al. ................. 363/21.05 |
| 6,385,058 B1 | 5/2002 | O'Meara | |
| 6,452,367 B2 * | 9/2002 | Watanabe ..................... 323/267 |
| 6,804,126 B2 * | 10/2004 | Lucas ......................... 363/21.01 |
| 2001/0028570 A1 | 10/2001 | Mullett et al. | |
| 2006/0158908 A1 * | 7/2006 | Usui ............................... 363/15 |
| 2006/0267565 A1 * | 11/2006 | Louvel et al. ................. 323/282 |
| 2009/0008995 A1 * | 1/2009 | Cyr ................................. 307/31 |

FOREIGN PATENT DOCUMENTS

| | | |
|---|---|---|
| JP | 11-187659 | 7/1999 |
| JP | 2000-350452 | 12/2000 |
| JP | 2000-354375 | 12/2000 |
| JP | 2004-187475 | 7/2004 |

OTHER PUBLICATIONS

European Search Report mailed Jun. 19, 2008 re: European Application No. 07106920.7 (6 pp).

* cited by examiner

*Primary Examiner* — Gary L Laxton
*Assistant Examiner* — Nguyen Tran
(74) *Attorney, Agent, or Firm* — Staas & Halsey LLP

(57) ABSTRACT

A power supply, which outputs a plurality of voltages in order to improve the cross regulation between output voltages and at the same time reduce the amount of electric power consumed, and an image forming device having the same are disclosed. The power supply includes a power converter, which generates a first output power source and a second output power source in response to an external power supply and a power control signal, respectively; a power output part, which includes output parts to rectify and smooth each of the first and second output power sources; a first output controller, which receives the first output power source feedback from the power output part to generate the power control signal; and a second output controller, which receives the second output power source feedback from the power output part to control to operate the power output part in stable mode.

32 Claims, 11 Drawing Sheets

POWER SUPPLY AND IMAGE FORMING DEVICE HAVING THE SAME

CROSS-REFERENCE TO RELATED APPLICATION

This application claims the benefit of Korean Patent Application No. 2006-71768, filed Jul. 28, 2006 in the Korean Intellectual Property Office, the disclosure of which is incorporated herein by reference.

BACKGROUND OF THE INVENTION

1. Field of the Invention

Aspects of the present invention relate to a power supply and an image forming device having the same, and, more particularly, to a power supply, which supplies a voltage having a plurality of potential levels in order to improve cross regulation between outputted voltages and at the same time reduce electric power consumption, and an image forming device having the same.

2. Description of the Related Art

Generally, power supplies using switching methods (hereinafter referred to as "switching power supplies") have been widely utilized. In the switching methods, a direct current obtained by rectifying and smoothing a commercial alternating current is switched by a predetermined high frequency (for example, about 100 kHz) to be converted to a desired voltage by a high efficiency transformer. A method for controlling output voltages of the switching power supply uses a pulse width modulation (PWM) control method to control the duty cycle of a switching pulse according to the change of output voltage, a frequency control method to control the frequency of the switching pulse, and phase control method to control a phase of the switching pulse.

FIG. 9 is a view to illustrate an example of the switching power supply using the PWM control method. The switching power supply 10 in FIG. 9 using the PWM control method has a switching circuit 12 including one or more switches formed on a primary winding of a transformer 11. By turning the switching circuit 12 on or off, the switching power supply 10 converts a direct current input voltage DC_IN, which is applied to the primary winding of the transformer 11 and is not rectified, to a direct current output voltage DC_OUT. The generated direct current output voltage DC_OUT is rectified by a diode D1 and a capacitor C1 inside an output part 13 connected to a secondary winding of the transformer 11 (Vout) to be outputted. In the device shown, the switching circuit 12 is turned on or off in accordance with a control signal of an output controller 14 to modulate the pulse width of the switching pulse in response to the output signal from the output part 13.

In the switching power supply in FIG. 9, since the rectified end connected to the secondary winding has a simple structure, a small number of parts are used. Therefore, it is suitable to apply the switching power supply to a multi-output power supply that outputs voltages with different potential levels. FIGS. 10 and 11 are views to illustrate examples of conventional multi-output power supplies. In FIG. 10, a conventional multi-output power supply 20 according to the first example has power supplies 30 and 40. Each of the power supplies 30 and 40 has the same constitution as that of the power supply illustrated in FIG. 9. For example, each of the power supplies 30 and 40 has first and second input parts 31 and 41 receiving the direct current input voltage DC_IN; first and second power converters 32 and 42 each have the transformer; first and second output parts 33 and 43 rectifying the direct current output voltages DC_OUT1 and DC_OUT2 outputted from the power converters 32 and 42, respectively, to output the direct current output voltages; and first and second output controllers 34 and 44 modulating the pulse width in response to the direct current output voltages Vout1 and Vout2 outputted from the output parts 33 and 43, respectively, to output the pulse width. When the power supplies 30 and 40 are used in an external apparatus (for example the image forming device 50 shown, such as a printer,) an On/Off control signal to interrupt operation of the second power supply 40 is provided to the second output controller 44 to prevent an output of the switching pulse from the second output controller 44 in a standby mode when a print engine part 52 does not operate.

When the multi-output power supply 20 has the above-described structure, the multi-output power supply 20 has multiple input/output parts 31, 33, 41 and 43, the power converters 32 and 42, and the output controllers 34 and 44 to multi-output the voltage. Accordingly, a large number of parts are used, increasing the size of the power supply 20 and resulting in an increase in manufacturing cost.

Referring to FIG. 11, a conventional multi-output power supply 70 according to the second example has an input part 71 receiving the direct current input voltage DC_IN; a power converter 72 having a transformer having one primary winding and two secondary windings; first and second output parts 73 and 74 rectifying the direct current output voltages DC_OUT1 and DC_OUT2 outputted from the power converter 72, respectively, to output the direct current output voltages Vout1 and Vout2; and an output controller 75 modulating the pulse width of the switching pulse in response to the first direct current output voltage Vout1 of the second output part 73 to output the pulse width. When the multi-output power supply 70 has the above-described structure, the constitution of the input part 71 is simpler than the multi-output power supply 20 illustrated in FIG. 10, and is further simplified by including one power converter 72 and one output controller 75. Therefore, the manufacturing costs of the power supply 70 can be reduced.

However, in the multi-output power supply 70 according to the second example, the pulse width of the switching pulse inputted to the input part 71 for controlling the direct current output voltages Vout1 and Vout2 is modulated depending on the direct current output voltage Vout1 outputted from the first output part 73, so that the voltage stability of the direct current output voltage Vout2 of the second output part 74 decreases.

In particular, if the pulse width of the switching pulse is varied in order to compensate for the impedance when the impedance of the load of the first output part 73 or the second output part 74 changes, the voltage stability of the direct current output voltage at the other side (that is, the cross regulation) is reduced because one primary winding is used together with the secondary winding.

SUMMARY OF THE INVENTION

Aspects of the present invention provide a power supply and an image forming device having the power supply, in which the cross regulation of a multi-output power supply is improved, and at the same time the multi-output power supply operates in a standby mode to reduce electric power consumption.

Additional aspects and/or advantages of the invention will be set forth in part in the description which follows and, in part, will be obvious from the description, or may be learned by practice of the invention.

According to an aspect of the present invention, there is provided an image forming device comprising a power converter, a power output part, a first output controller, and a second output controller. The power converter generates a first output power source and a second output power source in response to an external power supply and a power control signal. The power output part rectifies and smoothes the output first and second output power sources. The first output controller receives the rectified and smoothed first output power source feedback from the power output part to generate the power control signal. The second output controller receives the rectified and smoothed second output power source to control operating modes of the power output part.

According to another aspect of the present invention, the operating modes comprise a normal mode, in which the second output power source is outputted with a level within an allowable error range with respect to a reference value; and a stable mode, in which the power output part is controlled to output the second output power source with a level within an allowable error range if the level of the second output power source exceeds the allowable error range.

According to another aspect of the present invention, the operating modes may also comprise a normal mode, in which the second output power source is outputted with a level within the allowable error range with respect to the reference value; and a standby mode, in which the power output part is controlled so that a level of the second output power source decreases to reduce an amount of electric power consumed.

According to another aspect of the present invention, the power output part includes a first output part to rectify and smooth the first output power source and a second output part to rectify and smooth the second output power sources. The second output controller connects the first output part and the second output part.

According to another aspect of the present invention, the second output controller comprises a first switching circuit with one end connected to the first output part, and another end connected to the second output part.

According to another aspect of the present invention, the second output controller may further comprise a differential circuit, to receive the rectified and smoothed second output power source and to generate a mode control signal to operate the power output part in a stable mode of the operating modes in which the second output power source is outputted within an allowable error range with respect to a reference value of the second output power source. The first switching circuit may be activated in response to the mode control signal.

According to another aspect of the present invention, the second output controller may further comprise a second switching circuit, to activate in response to an external control signal and to generate a mode control signal so that the power output part operates in a standby mode of the operating modes, in which a level of the second output power source decreases to reduce an amount of electric power consumed by the power output part. The first switching circuit may be activated in response to the mode control signal.

According to another aspect of the present invention, the second output controller further comprises a differential circuit, to receive the feedback of the second output power source and to generate a first mode control signal to operate the power output part in a stable mode of the operating modes in which the second output power source is outputted within an allowable error range with respect to a reference value; and a second switching circuit, to activate in response to an external control signal and to generate a second mode control signal so that the power output part operates in a standby mode of the operating modes, in which the level of the second output power source decreases to reduce an amount of electric power consumed. In this case, the first switching circuit may be activated in response to the first or second mode control signal.

According to another aspect of the present invention, the differential circuit and the second switching circuit may have an o-ring structure to provide the first and second mode control signals to the first switching circuit.

According to another aspect of the present invention, the first switching circuit comprises a bypass switch activated in response to the first or second mode control signal.

According to another aspect of the present invention, the first switching circuit may further comprise a rectifier element connected to the bypass switch in series to rectify the second output power source output from the power converter.

According to another aspect of the present invention, the bypass switch operates in a saturated region when operating in standby mode, and operates in a linear region between the saturated regions when operating in stable mode.

According to another aspect of the present invention, the differential circuit may generate the first mode control signal using a difference between the second output power source and the reference value.

According to another aspect of the present invention, the differential circuit may comprise a charge element to prevent excessive current from flowing into the first switching circuit.

According to another aspect of the present invention, there is provided an image forming device comprising a power supplier, a print controller, and a print engine part. The power supplier generates a first output power source and a second output power source in response to an external power supply and a power control signal and uses the second output power source to control operating modes of the power supplier. The print controller receives the first output power source to control the printing and an operating state of the image forming device. The print engine part receives the second output power source and the control signal outputted from the print controller to perform printing.

According to another aspect of the present invention, the operating modes comprise a normal mode, in which the second output power source is outputted with a level within an allowable error range with respect to a reference value; and a stable mode, in which the second output power source is outputted with a level within an allowable error range when the level of the second output power source exceeds the allowable error range.

According to another aspect of the present invention, the operating modes may also comprise a normal mode, in which the second output power source is outputted with a level within an allowable error range with respect to the reference value; and a standby mode, in which the level of the second output power source decreases to reduce an amount of electric power consumed.

According to another aspect of the present invention, the power supplier comprises a power converter to generate an unrectified first output power source and an unrectified second output power source in response to an external power supply and a power control signal; a power output part to rectify and smooth the output unrectified first and unrectified second output power sources; a first output controller to receive the first output power source from the power output part and generates the power control signal used at the power converter; and a second output controller to receive the second output power source from the power output part and controls the operating mode of the power output part.

According to another aspect of the present invention, the power output part includes a first output part to output the first output power source, and a second output part to output the second output power source. The second output controller includes a first switching circuit connected to the first and second output parts.

According to another aspect of the present invention, the second output controller may further comprise a differential circuit to receive the second output power source and to generate a mode control signal to operate the power output part in a stable mode of the operating modes in which the second output power source is outputted within an allowable error range with respect to a reference value of the second output power source. The first switching circuit may be activated in response to the mode control signal.

According to another aspect of the present invention, the second output controller may further comprise a second switching circuit to activate in response to an external control signal and to generate a mode control signal so that the power output part operates in standby mode of the operating modes, in which a level of the second output power source decreases to reduce an amount of electric power consumed by the power output part. The first switching circuit may be activated in response to the second mode control signal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
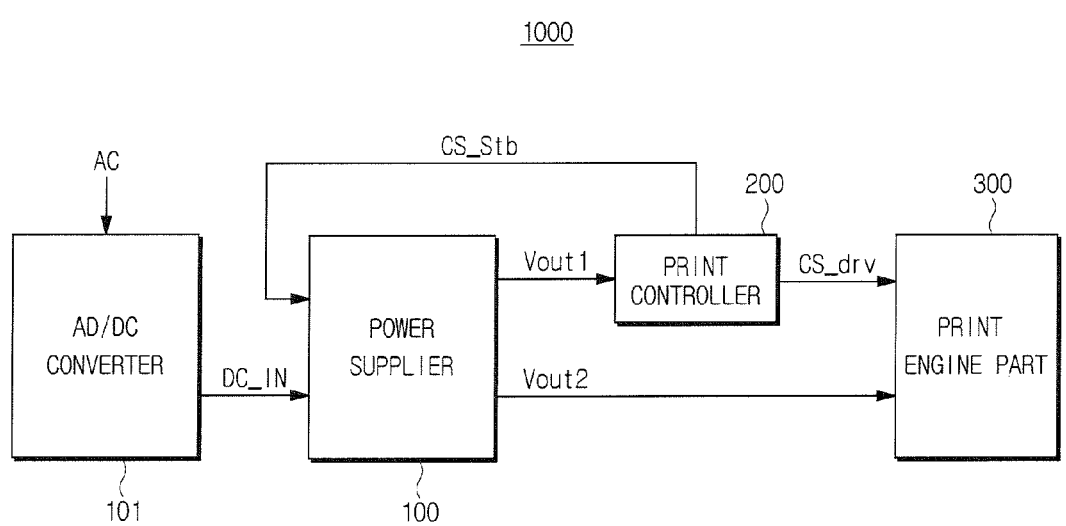
FIG. 1 is a block diagram to illustrate an image forming device according to one embodiment of the present invention.

Reference will now be made in detail to the present embodiments of the present invention, examples of which are illustrated in the accompanying drawings, wherein like reference numerals refer to like elements throughout. The embodiments are described below in order to explain the present invention by referring to the figures.

FIG. 1 is a block diagram illustrating an image forming device 1000 according to one embodiment of the present invention. Other aspects of the present invention may be used in any electric device, such as personal computers. In FIG. 1, an image forming device 1000 according to one embodiment of the present invention comprises an AC/DC converter 101, a power supplier 100, a print controller 200 and a print engine part 300. Specifically, the power supplier 100 has a switching mode power supply (hereinafter, referred to as "SMPS"). The SMPS receives a DC power source converted by the AC/DC converter 101, which converts an AC power source applied from the outside to a DC power source used by the power supplier 100. The converted DC power source falls below a predetermined level to be provided to each part inside the image forming device 1000. The AC/DC converter 101 can be any mechanism which performs a conversion of the AC power source to the DC power source, such as a bridge rectifier circuit or the like.

The power supplier 100 receives the DC input power source DC_IN and generates a plurality of DC output power sources Vout1 and Vout2 to be outputted. In other words, in order to generate and provide a rated voltage used in each part of the image forming device 1000, the power supplier 100 according to one embodiment of the present invention generates a plurality of voltages to be outputted. For example, the print controller 200 may include a microcontroller and circuit elements connected to the microcontroller, and the power supplier 100 may generate a first output voltage Vout1 within the allowable error range based on 5V to output the voltage when a rated voltage of 5V is used in the microcontroller and the circuit elements. Additionally, the print engine part 300 may include an operating motor to perform printing, a transfer roller connected to the motor, or the like. When a rated voltage of 24V is used to operate the operating motor and to heat the transfer roller, the power supplier 100 generates a second output voltage Vout2 within the allowable error range based on 24V to output the voltage.

In particular, the power supplier 100 according to an embodiment of the present invention may comprise one transformer including one primary winding and a plurality of secondary windings facing the primary winding. Additionally, the power supplier 100 operates in stable mode to improve the cross regulation between the first or second output voltages Vout1 and Vout2. When either the first or second output voltage Vout1 or Vout2 is not used (for example when it does not matter that printing is not performed or to stop operation of the print engine part 300), the power supplier 100 operates in standby mode.

The print controller 200 operates by the first output voltage Vout1 outputted from the power supplier 100 to generate a drive control signal CS_drv controlling each constituent element of the print engine part 300, and to control the whole operation of the image forming device 1000. In other words, the print controller 200 controls the whole operation of the print engine part 300, which loads printing paper, transfers paper, forms images on printing paper based on the print data, fixes the printed images, discharges the printing results, and/or performs other functions, depending on the nature of the image forming apparatus. The print controller 200 may also control the operating state of the image forming device 1000 by determining printing errors such as paper jams.

Additionally, the print controller 200 generates a standby mode control signal CS_stb to be outputted in order to operate the power supplier 100 in standby mode. The standby mode control signal CS_stb may be applied by a user, or be automatically outputted if it the print controller 200, or other component, determines that processing of the print data is completed. For example, when the image forming device 1000 is a laser printer, the print engine part 300 comprises a fixer comprising a photosensitive drum (OPC drum), a developing unit, a fixing unit or the like, and a laser scanning unit (LSU) irradiating a laser beam on the photosensitive drum.

Each part of the print engine part 300 is operated by the second output voltage Vout2 outputted from the power supplier 100 and the drive control signal CS_drv outputted from the print controller 200 to form predetermined images on a print medium based on the print data.

Figure 2:
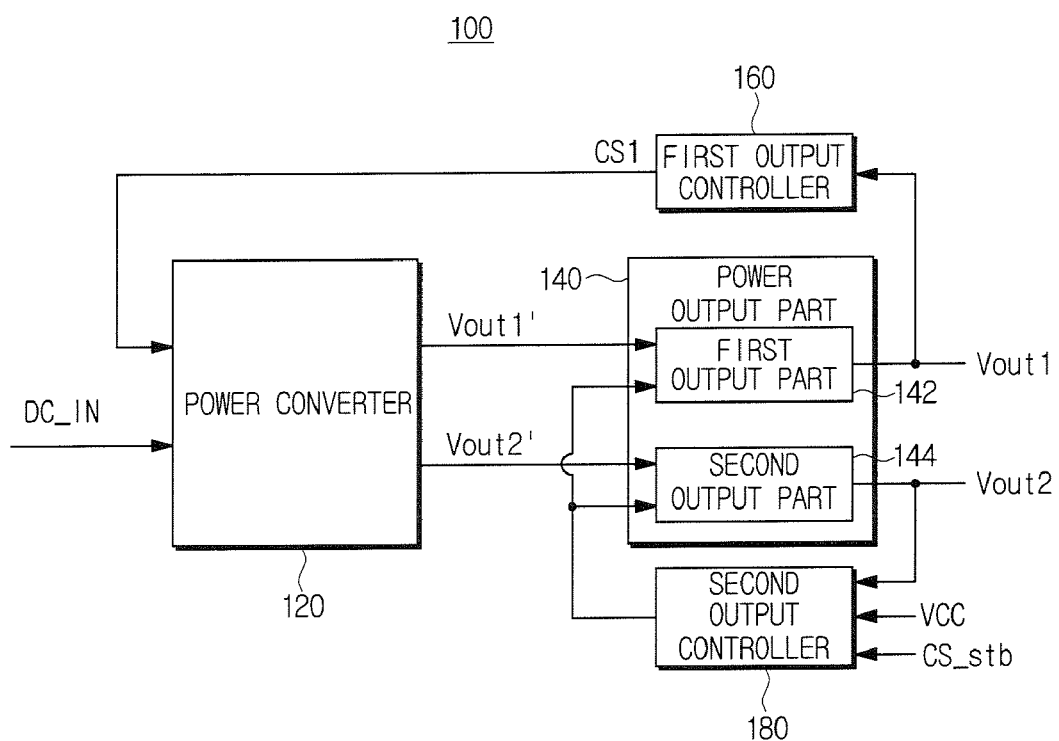
FIG. 2 is a block diagram to illustrate one embodiment of a power supplier illustrated in FIG. 1.

FIG. 2 is a block diagram illustrating an embodiment of the power supplier 100 shown in FIG. 1. In FIG. 2, the power supplier 100 comprises a power converter 120, a power output part 140, a first output controller 160, and a second output controller 180. Specifically, the power converter 120 decreases the DC input voltage DC_IN below a predetermined level, and outputs output voltages Vout1' and Vout2' respectively having a plurality of potential levels.

The power converter 120 comprises a transformer, including one primary winding and a plurality of secondary windings, all of which are used together with the primary winding in order to provide the plurality of output voltages, and at the same time to reduce the number of the elements used in the power supplier 100 and to reduce the size of the power supplier 100.

The power converter 120 further comprises a switching circuit, which receives a switching pulse signal and controls the voltage applied to the primary winding according to the pulse width of the switching pulse signal to form an induced voltage variably.

The power output part 140 comprises output parts 142 and 144, which receive the output voltages Vout1' and Vout2', which are output from the power converter 120 and which are not rectified and smoothed. The output parts 142, 144 output the output voltages Vout1 and Vout2, respectively, which are rectified and smoothed.

When the first output controller 160 receives first output voltage Vout1 feedback from the first output part 142 and the first output voltage Vout1 is changed, the first output controller 160 outputs a first control signal CS1 controlling the operation of the power converter 120. At this time, the first control signal CS1 is the switching pulse signal, and the pulse width of the first control signal CS1 is modulated based on the electric potential change of the first output voltage Vout1. The first control signal CS1 having the modulated pulse width is provided to the power converter 120 to control the potential of the first and second output voltages Vout1' and Vout2', which are not rectified or smoothed.

When the second output controller 180 receives second output voltage Vout2 feedback from the second output part 144, the second output voltage Vout2 is compared to a reference voltage Vref. If the second output voltage Vout2 exceeds the maximum value of an allowable error range, the power supplier 140 operates in a stable mode to improve the cross regulation of the first and second output voltages Vout1 and Vout2.

Additionally, the second output controller 180 receives the standby mode control signal CS_stb outputted from the print controller 200 illustrated in FIG. 1, and an operating voltage Vcc of a predetermined level to operate the power output part 140 in standby mode.

Figure 3:
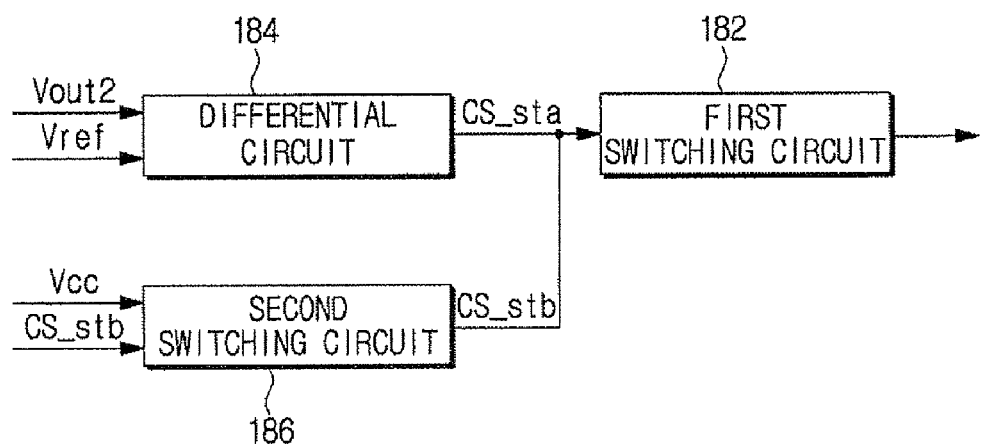
FIG. 3 is a block diagram to illustrate in detail one embodiment of a second output controller illustrated in FIG. 2.

FIG. 3 is a block diagram illustrating in detail the second output controller 180 illustrated in FIG. 2. The second output controller 180 according to one embodiment of the present invention comprises a first switching circuit 182, a differential circuit 184, and a second switching circuit 186. Specifically, the differential circuit 184 compares the second output voltage Vout2 outputted from the second output part 144 to the reference voltage Vref. If the second output voltage Vout2 exceeds the maximum value of the allowable error range based on the reference voltage Vref, the differential circuit 184 outputs a stable mode control signal CS_sta to operate the power supplier 140 in stable mode.

The second switching circuit 186 receives the power voltage Vcc and the standby mode control signal CS_stb outputted from the print controller 200 to selectively output the power voltage Vcc or a ground voltage GND.

The first switching circuit 182 operates in the stable mode in response to the stable mode control signal CS_sta outputted from the differential circuit 184, or operates in standby mode in response to the standby mode control signal CS_stb outputted from the second switching circuit 186.

Additionally, when the first switching circuit 182 does not operate in the stable mode, the differential circuit 184 outputs a signal of the potential level to deactivate the first switching circuit 182. When the first switching circuit 182 does not operate in the standby mode, the second switching circuit 186 also outputs a signal of the potential level to deactivate the first switching circuit 182. Accordingly, the first switching circuit 182 is deactivated, and the power supplier 140 operates in the normal mode.

In normal mode, the power supplier 140 normally outputs the first and second output voltages Vout1 and Vout2, and operates in a state in which the second output voltage Vout2 outputted from the second output part 144 has a potential level within a range not exceeding the allowable error range.

Figure 4:
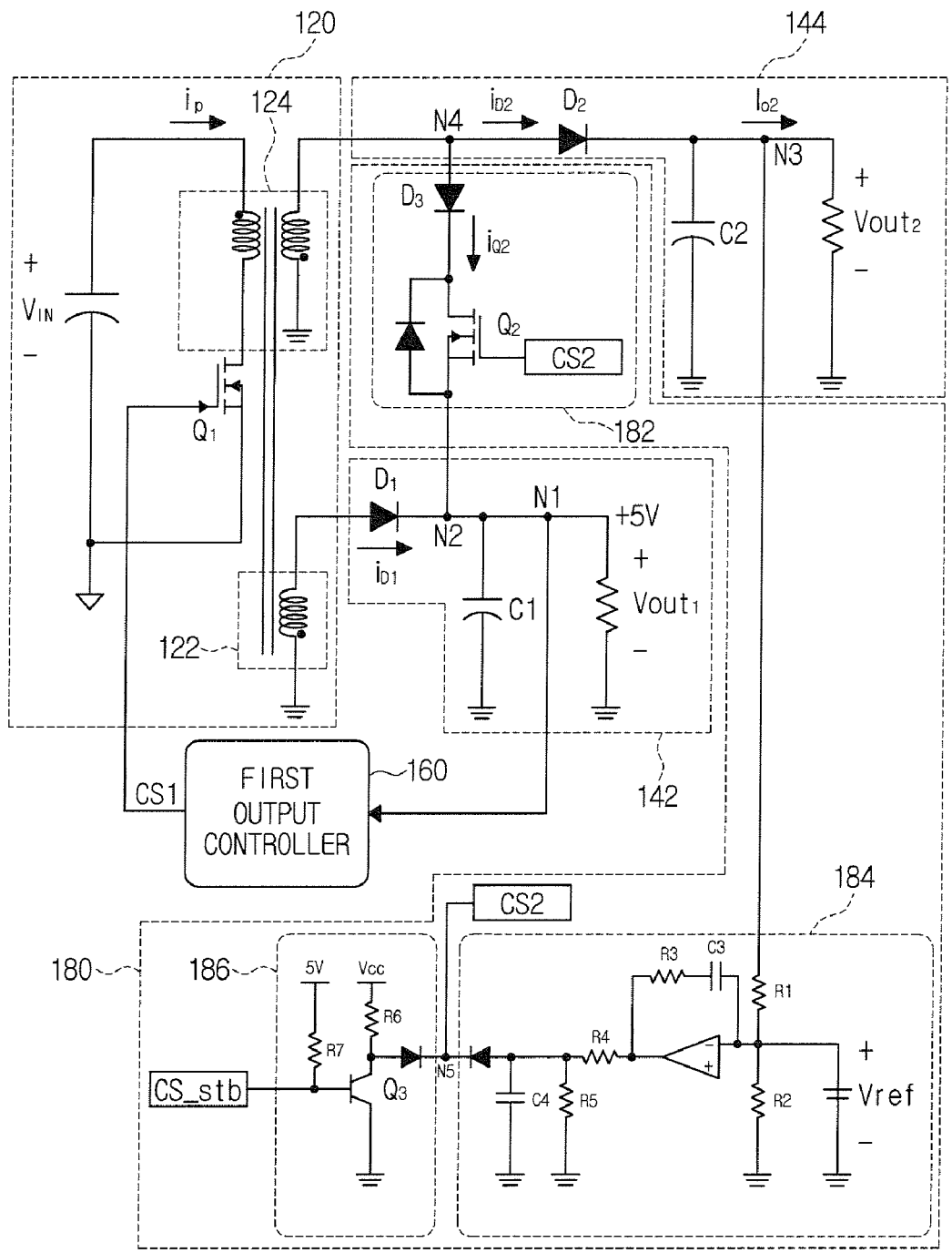
FIG. 4 is a circuit diagram to illustrate one embodiment of a power supplier illustrated in FIG. 2.
Figure 5:
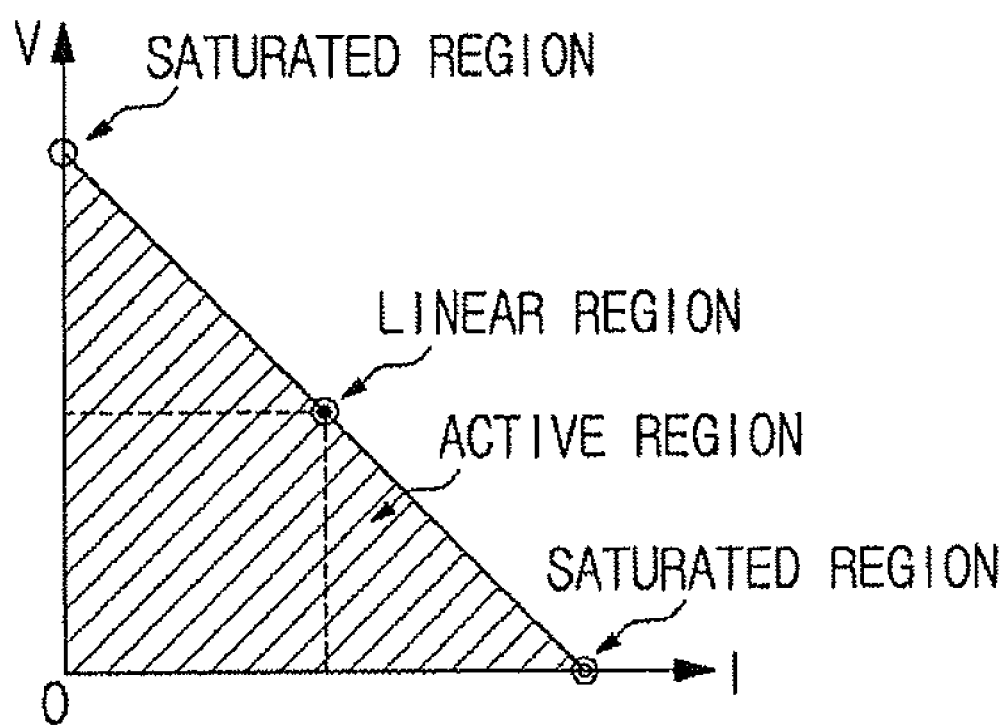
FIG. 5 is a graph to explain the operation of a first switching circuit illustrated in FIG. 4.
Figure 6:
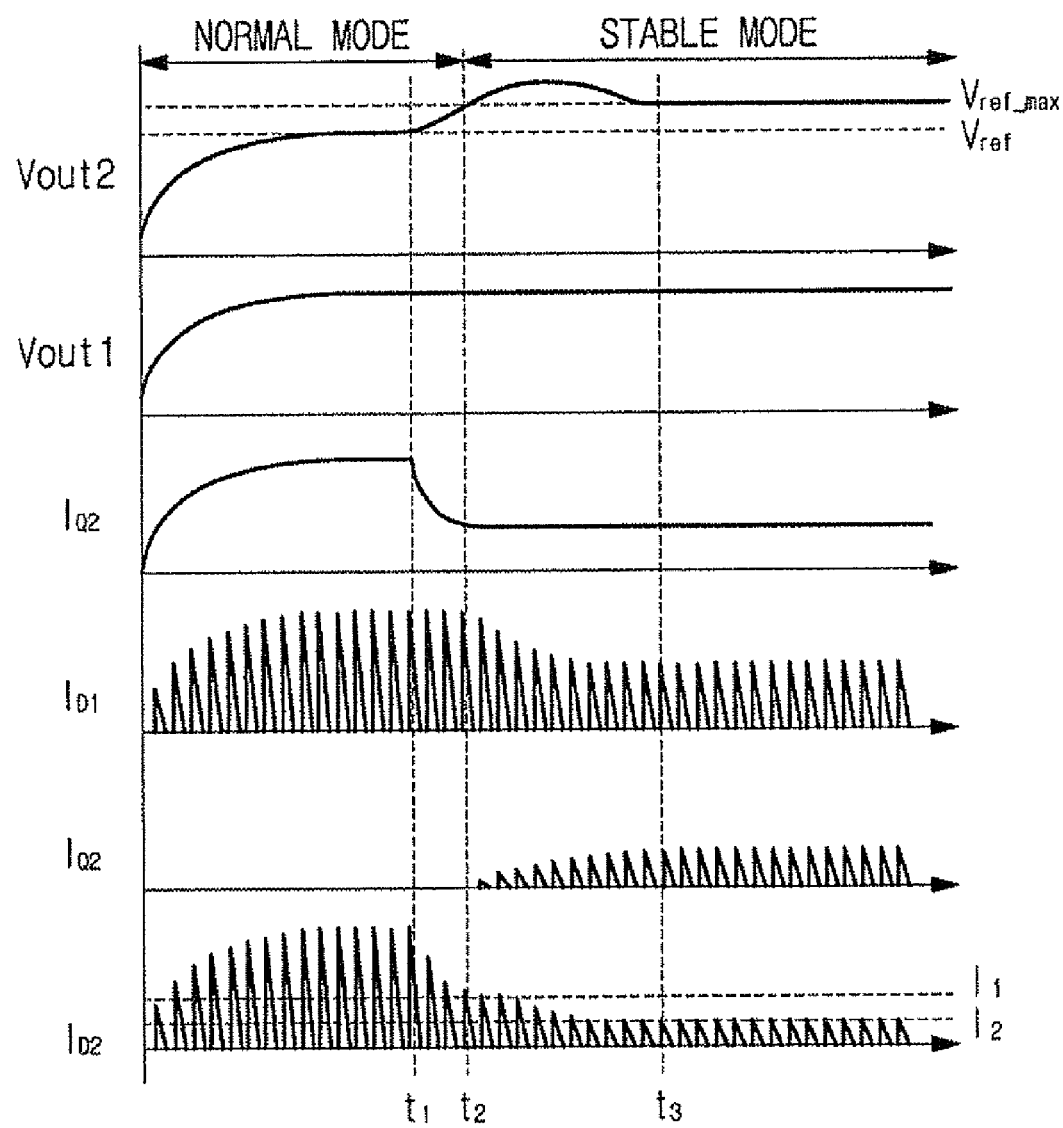
FIGS. 6 and 7 are waveform diagrams to explain the operation of the second output controller illustrated in FIG. 5 in a stable mode.
Figure 7:
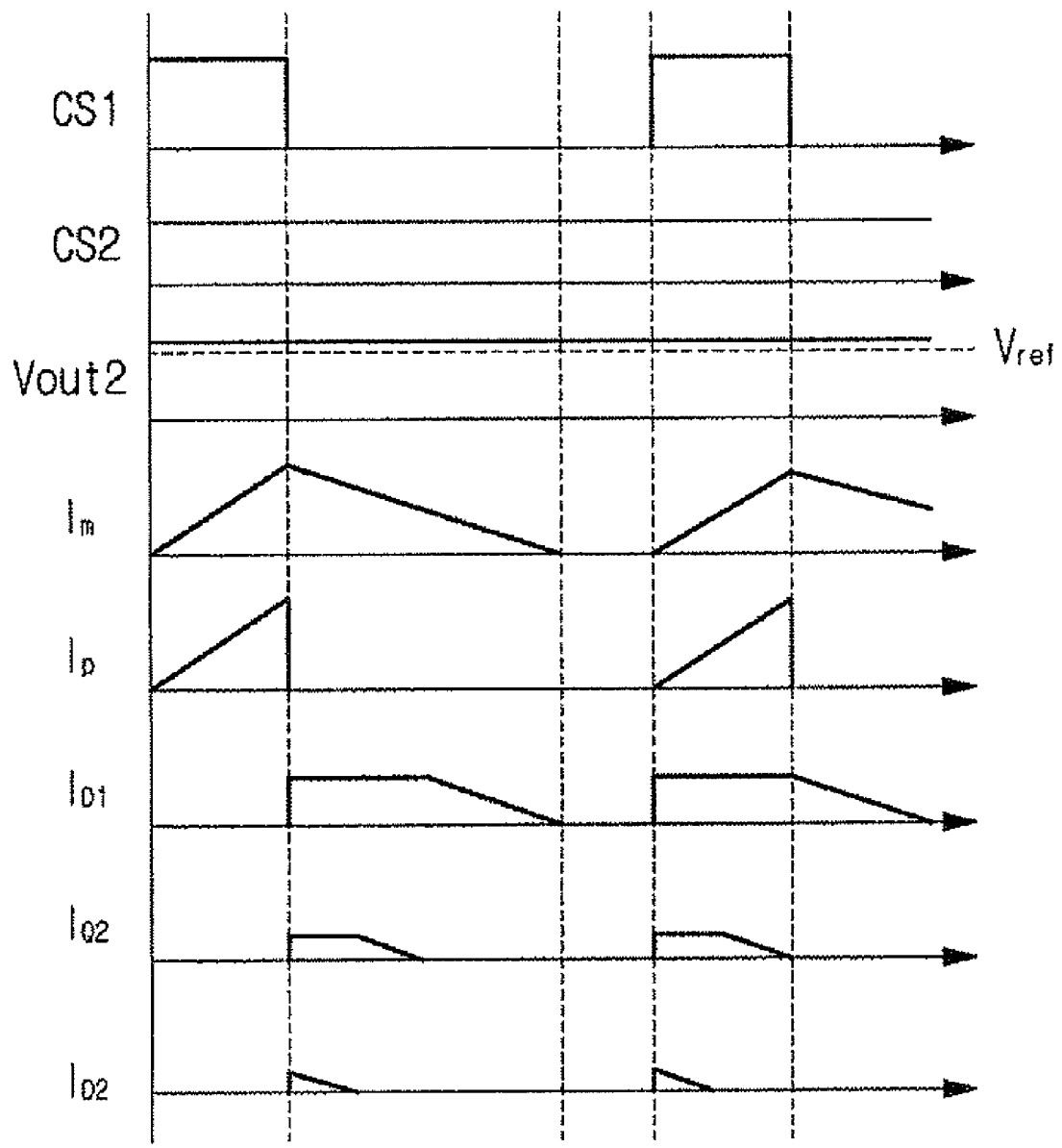
Figure 8:
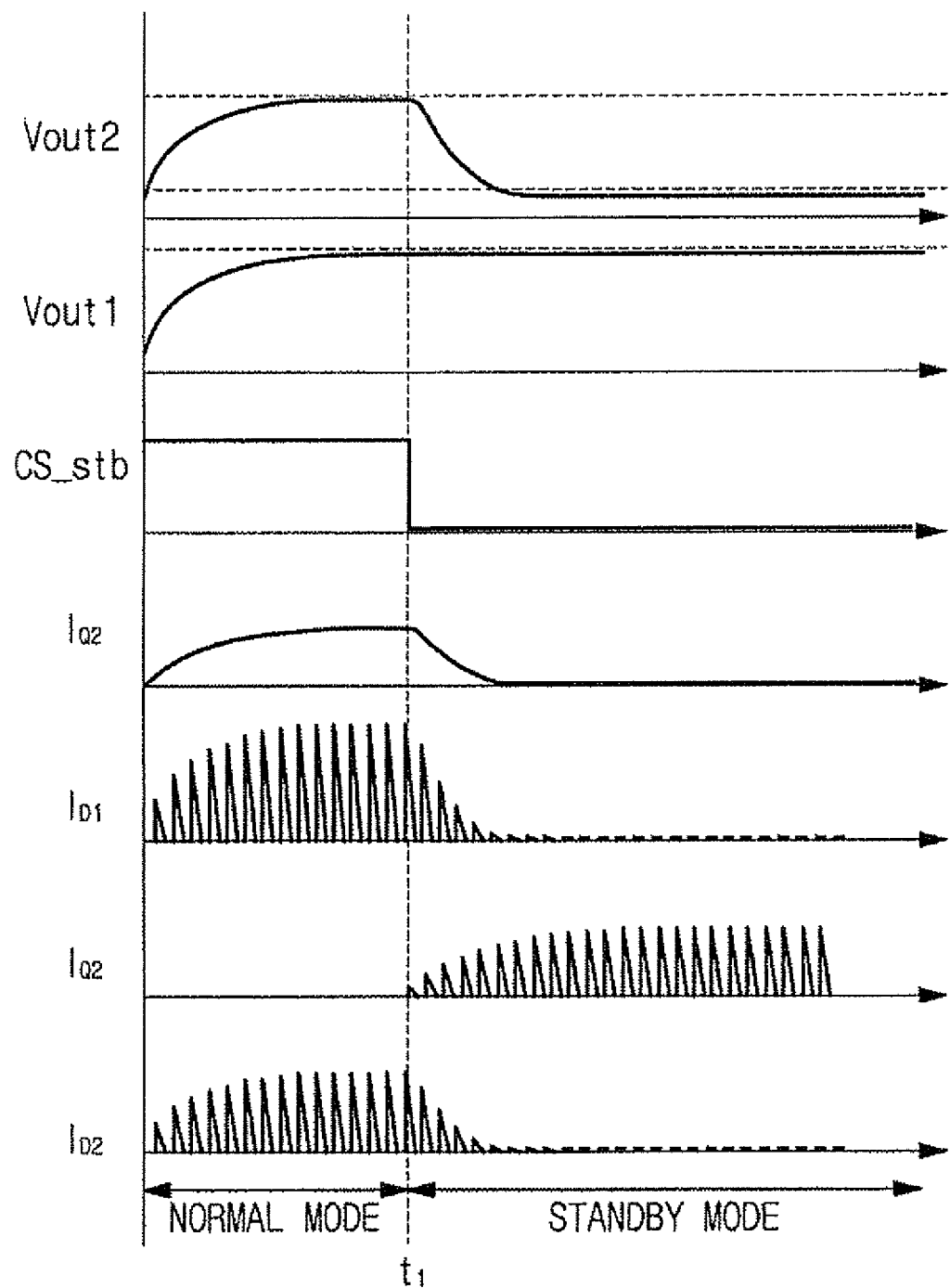
FIG. 8 is a waveform diagram to explain the operation of the second output controller illustrated in FIG. 5 in a standby mode.
Figure 9:
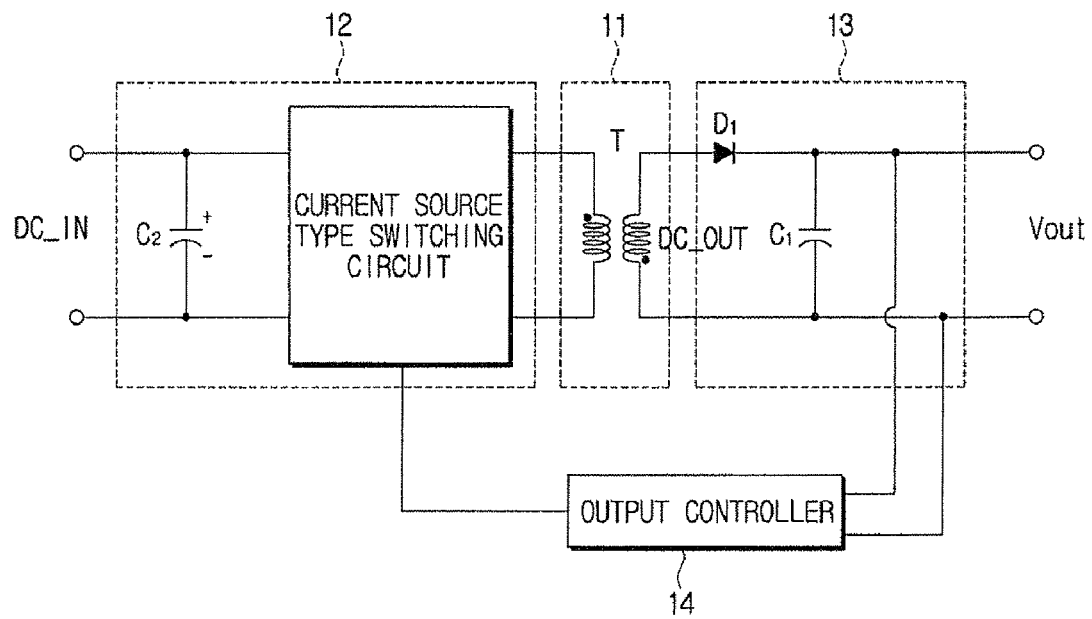
FIG. 9 is a view to illustrate an example of a switching power supply using a PWM control method.
Figure 10:
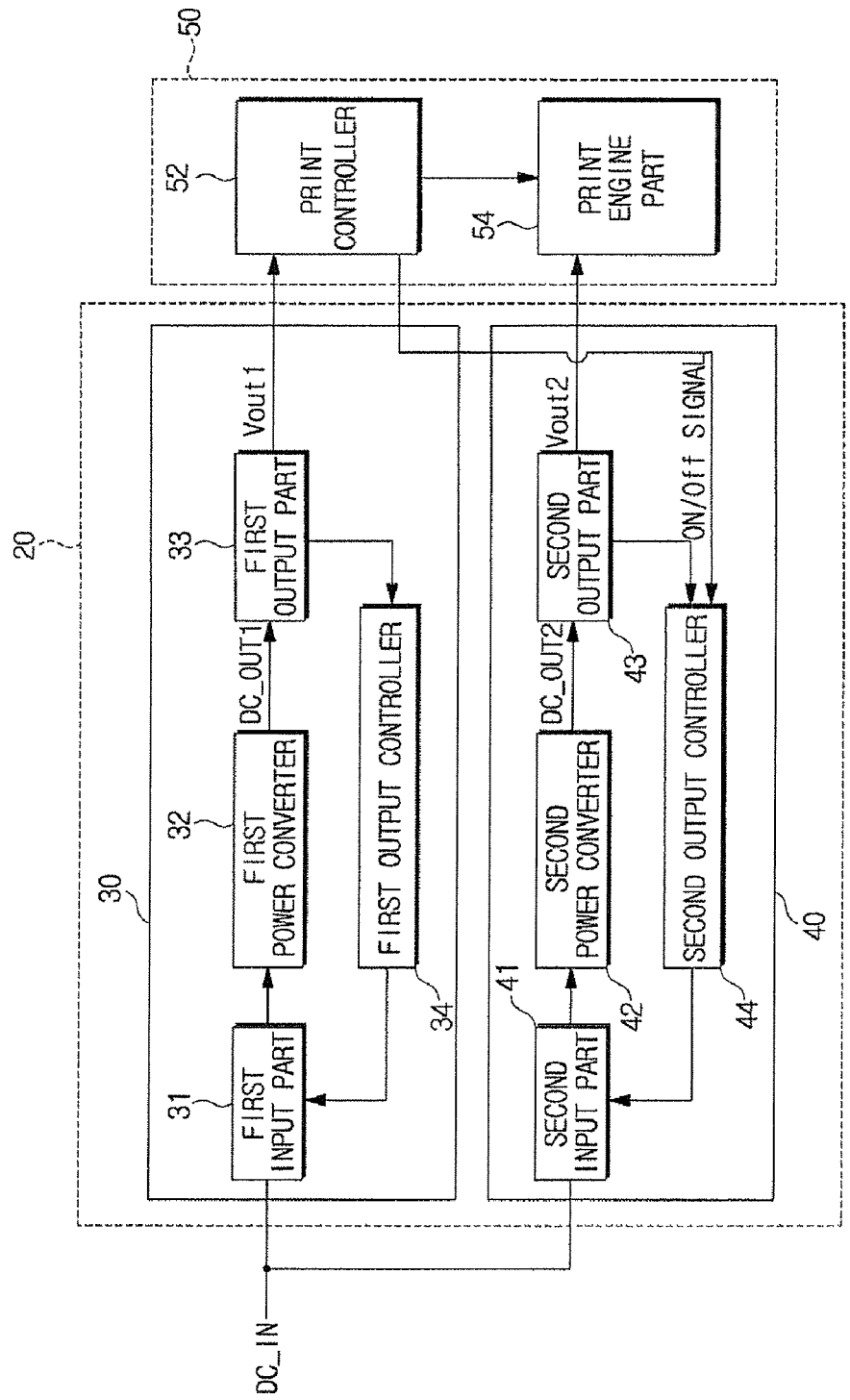
FIGS. 10 and 11 are views to illustrate examples of conventional multi-output power supplies.
Figure 11:
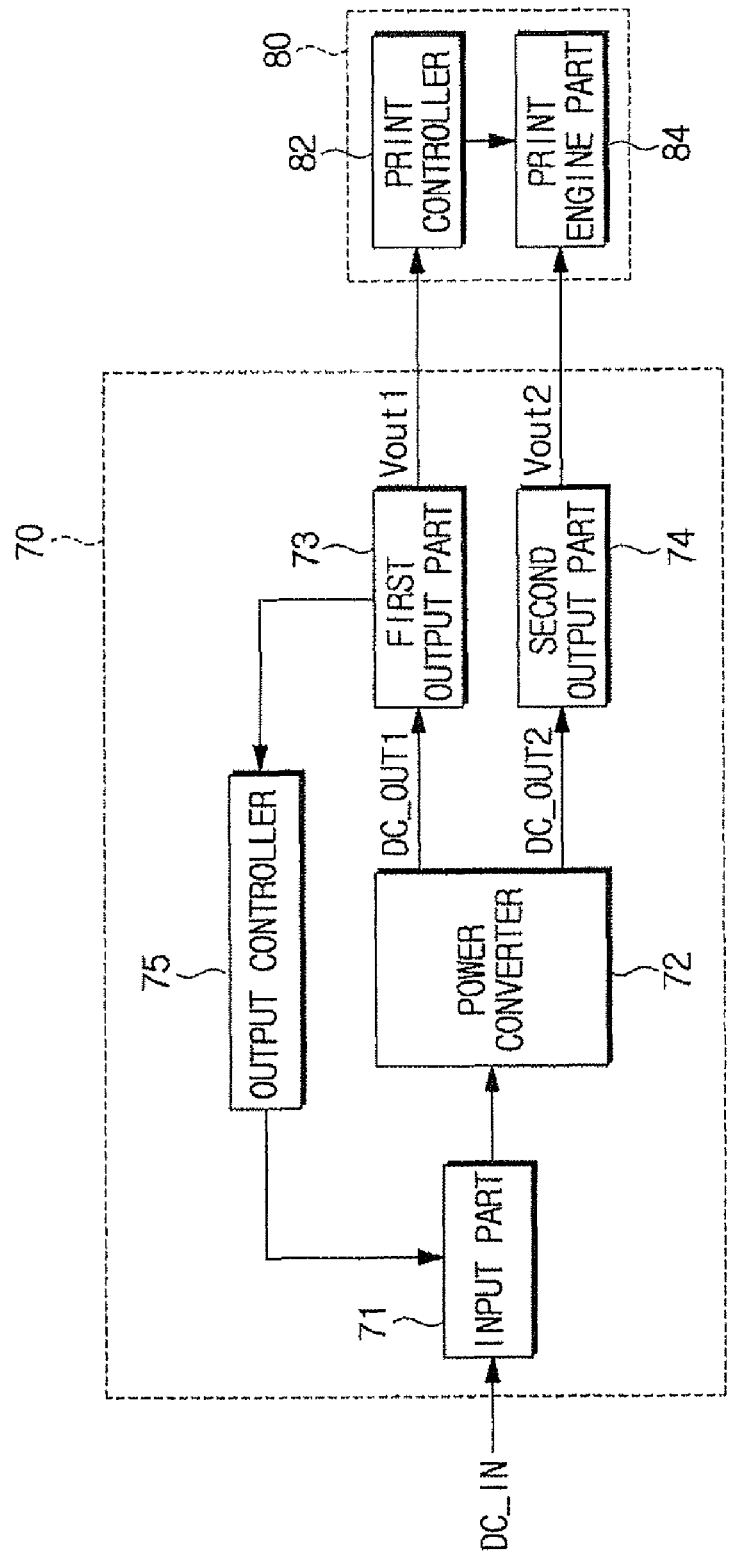

The constitution and operation of the second output controller 180 is described in more detail as follows, with reference to FIGS. 4 through 8. FIG. 4 is a circuit diagram illustrating an embodiment of the power supplier 100 illustrated in FIG. 2. FIG. 5 is a graph to explain the operation of the first switching circuit 182 illustrated in FIG. 4. In addition, FIGS. 6 and 7 are waveform diagrams to explain the operation of the second output controller 180 illustrated in FIG. 5 in stable mode, and FIG. 8 is a waveform diagram to explain the operation of the second output controller 180 illustrated in FIG. 5 in standby mode.

Referring to FIGS. 2 and 4, the power supplier 100 according to an embodiment of the present invention comprises the power converter 120, the power output part 140, the first output controller 160, and the second output controller 180. The power converter 120 comprises a first power converter 122, a second power converter 124, and a first switching element Q1. The power output part 140 comprises the first and second output parts 142 and 144. The first output controller 160 is connected to the first output part 142 and the first switching element Q1. The second output controller 180 is connected to the first and second output parts 142 and 144, and comprises the first switching circuit 182, the differential circuit 184, and the second switching circuit 186.

Specifically, the power converter 120 comprises the primary winding and the first switching element Q1 connected to the primary winding. The first power converter 122 comprises a first secondary winding facing the primary winding, and the second power converter 124 comprises a second secondary winding facing the primary winding. The first control signal CS1 outputted from the first output controller 160 is applied to the gate terminal of the first switching element Q1 to perform switching.

The first output part 142 comprises a first diode D1 and a first capacitor C1. The second output part 144 comprises a second diode D2 and a second capacitor C2. The diodes D1 and D2 and the capacitors C1 and C2 rectify and smooth the direct current output voltages Vout1', Vout2' induced from the first and second power converters 122 and 124, respectively.

The first output controller 160 is connected to a first node N1 of the first output part 142 to receive the first output voltage Vout1 and to output the first control signal CS1 as a switching pulse signal having the pulse width modulated accordingly. The switching pulse signal controls the direct current input voltage DC_IN to be applied to the primary winding.

The second output controller 180 comprises the differential circuit 184 to operate in the stable mode and the second switching circuit 186 to operate in the standby mode. In other embodiments, the second output controller 180 may comprise only the differential circuit 184, only the second switching circuit 186, or both the differential circuit 184 and the second switching circuit 186.

The differential circuit 184 is connected to a third node N3 of the second output part 144 to receive the second output voltage Vout2. Additionally, the differential circuit 184 comprises an error detection circuit OP-AMP, which compares the reference voltage Vref to the received second output voltage Vout2. Integrated circuits R3 and C3 integrate the detected error voltage. Allotter circuits R4 and R5 divide the result of integration and output the second control signal CS2 to operate the first switching circuit 182 with phase 1. A charge element C4 performs a soft start function to prevent the first switching circuit 182 from being damaged due to excessive current flowing through the first switching circuit 182 as a result of the first switching circuit 182 being turned on or off suddenly.

The second switching circuit 186 comprises a third switching element Q3, and activates the third switching element Q3 with phase 2 to output the power voltage Vcc to the second control signal CS2 when operating in the standby mode in response to the standby mode control signal CS_stb applied from the outside. Additionally, when the power supplier 140 operates in the normal mode or the stable mode, the second switching circuit 186 prevents the output of the power voltage Vcc to the second control signal CS2 by activating the third switching element Q3.

The first and third switching elements Q1 and Q3 can variously comprise an npn type transistor, a pnp type transistor, or the like.

The first switching circuit 182 is connected to a second node N2 of the first output part 142 and a fourth node N4 of the second output part 144. The first switching circuit 182 comprises a third diode D3 rectifying the first output voltage Vout1', which is divided in the fourth node N4 and is not rectified, and a second switching element Q2 activated with phase 1 or phase 2 in response to the second control signal CS2 outputted from the differential circuit 184 or the second switching circuit 186. The second control signal CS2 outputted from the differential circuit 184 or the second switching circuit 186 may have an o-ring structure to be commonly inputted into the gate terminal of the second switching element Q2. Other aspects may use other structures.

The second switching element Q2 may comprise a bypass switch, but is not restricted thereto.

The second switching element Q2 operating with phase 1 and phase 2 is described below with reference to FIG. 5. The bypass switch Q2 operates with phase 1 operating in an active region indicated by oblique lines, and phase 2 operating in a saturated region, which is at one end of the straight line.

When operating with phase 1, a predetermined current passes through a drain-source terminal of the bypass switch Q2 if a potential of a predetermined level is applied to the bypass switch Q2. When operating with phase 2, the bypass switch Q2 is turned on or off so that the first switching circuit 182 allows the second and fourth nodes N2 and N4 to be short or open. The bypass switch Q2 may comprise an NMOS transistor or a PMOS transistor, but is not restricted thereto.

A method for operating the power output part 140 in stable mode is described below with reference to FIGS. 4, 6 and 7 as follows. Referring to FIG. 6, the normal mode, in which the second output voltage Vout2 outputted from the second output part 144 has a potential level within a range not exceeding the allowable error range, is indicated by a time point t1. Until reaching the time point t1, the difference between the voltages outputted from the differential circuit 184 has a negative value to output a voltage of 0V. Accordingly, the differential circuit 184 does not output the second control signal CS2 and a current Ip caused by the direct current input voltage DC_IN is applied to the primary winding according to the switching operation of the first switching element Q1. Therefore, the induced voltages are formed in each secondary windings of the first and second power converters 124 and 126 in response to the winding ratio of the primary winding to the secondary winding.

The induced voltages formed in each of the first and second power converters 124 and 126 is rectified and smoothed by the diode D1 and the capacitor C1 of the first output part 142 and the diode D2 and the capacitor C2 of the second output part 144, respectively, to be outputted as a direct current output voltage Vout1 and Vout2, respectively.

Subsequently, when the impedance of the load of the second output part 144 changes between the time points t1 to t2, the second output voltage Vout2 outputted from the second output part 144 begins to increase. At time point t2, the second output voltage Vout2 reaches the maximum value Vref_max of the allowable error range, the second control signal CS2 having a uniform time constant is outputted from the error detection circuit OP-AMP by a time constant of the integrated circuits R3 and C3. In this situation, since the second control signal CS2 changes according to the second output voltage Vout2, the second switching element Q2 operates in a linear region of the straight line illustrated in FIG. 5 so that the second switching element Q2 is equal to the reference voltage Vref.

When the error detection circuit OP-AMP operates, the impedance between drain and source of the second switching element Q2 of the first switching circuit 182 decreases to increase a current IQ2 flowing in the second switching element Q2 and moving from the fourth node N4 to the second node N2. Accordingly, a current ID2 flowing in the second diode D2 of the second output part 144 decreases, and as a result, the second output voltage Vout2 is outputted within a range not exceeding the maximum value Vref_max of the allowable error range for the reference voltage Vref at a time point t3. Therefore, output of excessive voltages in the second output part 144 is prevented.

Referring to FIG. 7, the second control signal CS2 is applied to the second switching element Q2 to operate the power output part 140 in the stable mode. A current ID1 is induced from the current Ip applied to the primary winding of the power converter 120 by the direct current input voltage DC_IN, and then applied to the first output part 142. When the first switching circuit 182 operates with phase 1, the current ID1 decreases by the amount of the current IQ2 flowing in the second switching element Q2, and is then applied. Additionally, when the first switching circuit 182 operates, the current ID2 flowing in the second output part 144 also decreases by the amount of the current IQ2 flowing in the second switching element Q2, and is applied.

A method for operating the power output part 140 in standby mode is described below with reference to FIGS. 4 and 8. Operating until reaching time point t1, that is, the normal mode, in which the second output voltage Vout2 outputted from the second output part 144 has a potential level within a range not exceeding the allowable error range, is performed in the same manner as in the description of FIG. 6. When the standby mode control signal CS_stb is applied from the outside at time point t1, the third switching element Q3 of the second switching circuit 186 turns off. After time point t1, that is when the power output part 140 operates in standby mode, the third switching element Q3 is turned on or off. In this case, FIG. 8 illustrates that the standby mode control signal CS_stb changes from a 'high' logical level to a 'low' logical level to turn off the third switching element Q3, but the standby mode control signal CS_stb may change in another fashion according to the third switching element Q3 and the second switching element Q2.

When the third switching element Q3 is turned off, a fifth node N5 is formed with the potential level of the power voltage Vcc, and accordingly the second control signal CS2 is outputted with the potential level of the power voltage Vcc to turn on the second switching element Q2 of the first switching circuit 182. At this time, the second switching element Q2 operates in the saturated region illustrated in FIG. 5.

When the second switching element Q2 operates in the saturated region, the first switching circuit 182 is activated to form the fourth and second nodes N4 and N2 having the same potential level. Accordingly, the current IQ2 applied to the second switching element Q2 increases, and thus, the current ID1 applied to the load through the first diode D1 in the first power converter 122 and the current ID2 applied to the load through the second diode D2 in the second power converter 124 decrease. Accordingly, the second output voltage Vout2 outputted from the second output part 144 has substantially the same potential level as that of the first output voltage Vout1 outputted from the first output part 142, so that the leakage current occurring in the second output part 144 can be reduced. Therefore, the amount of electric power consumed in the second output part 144 is reduced.

As described above, according to aspects of the present invention, it is possible to improve the cross regulation between a output voltage outputted from an output part, which does not independently include the output controller to control the pulse width, and another output voltage outputted from another output part in the multi-output power supply.

Additionally, in aspects of the invention, the multi-output power supply operates in standby mode, and the output voltage, which is not used, falls below the predetermined level to output the voltage, so that the amount of electric power consumed in the power supply can be reduced.

Furthermore, in aspects of the invention, the current capacity of the switch is reduced using the bypass switch to remove the constitution of a switch heat insulation means, and the manufacturing cost of the power supply can be reduced accordingly.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A power supply comprising:
   a power converter to generate a first output power source and a second output power source in response to an external power supply and a power control signal;
   a power output part to rectify and smooth the output first and second output power sources;
   a first output controller to receive the rectified and smoothed first output power source from the power output part to generate the power control signal used at the power converter; and
   a second output controller to receive the rectified and smoothed second output power source feedback from the power output part to control operating modes of the power output part,
   wherein the power output part comprises a first output part to rectify and smooth the first output power source, and a second output part to rectify and smooth the second output power sources,
   the second output controller connects the first output part and the second output part, and
   the second output controller comprises a first switching circuit with one end connected to the first output part and another end is connected to the second output part.

2. The power supply as claimed in claim 1, wherein the operating modes comprise:
   a normal mode, in which the second output power source is outputted with a level within an allowable error range with respect to a reference value; and
   a stable mode, in which the power output part is controlled to output the second output power source with a level within an allowable error range when a level of the second output power source exceeds the allowable error range.

3. The power supply as claimed in claim 1, wherein the operating modes comprise:
   a normal mode, in which the second output power source is output with a level within the allowable error range with respect to the reference value; and
   a standby mode, in which the power output part is controlled so that a level of the second output power source decreases to reduce an amount of electric power consumed.

4. The power supply as claimed in claim 1, wherein:
   the second output controller further comprises a differential circuit to receive the rectified and smoothed second output power source and to generate a first mode control signal to operate the power output part in a stable mode of the operating modes in which the second output power source is output within an allowable error range with respect to a reference value of the second output power source, and
   the first switching circuit is activated in response to the first mode control signal.

5. The power supply as claimed in claim 1, wherein:
   the second output controller further comprises a second switching circuit to activate in response to an external control signal and to generate a mode control signal so that the power output part operates in a standby mode of the operating modes, in which the level of the second output power source decreases to reduce the amount of electric power consumed by the power output part, and
   the first switching circuit is activated in response to the mode control signal.

6. The power supply as claimed in claim 1, wherein:
   the second output controller further comprises a differential circuit, to receive the rectified and smoothed second output power source and to generate a first mode control signal to operate the power output part in a stable mode of the operating modes in which the second output power source is outputted within an allowable error range with respect to a reference value; and a second switching circuit, which is activated in response to an external control signal and to generate a second mode control signal so that the power output part operates in a standby mode of the operating modes, in which a level of the second output power source decreases to reduce an amount of electric power consumed, and the first switching circuit is activated in response to the first or second mode control signal.

7. The power supply as claimed in claim 4, wherein the first switching circuit comprises a bypass switch activated in response to the mode control signal.

8. The power supply as claimed in claim 7, wherein the first switching circuit further comprises a rectifier element connected to the bypass switch in series to rectify the second output power source output from the power converter.

9. The power supply as claimed in claim 7, wherein the bypass switch operates in a saturated region when operating in standby mode, and operates in a linear region between the saturated regions when operating in stable mode.

10. The power supply as claimed in claim 4, wherein the differential circuit generates the mode control signal using a difference between the second output power source and the reference value.

11. The power supply as claimed in claim 10, wherein the differential circuit comprises a charge element to prevent excessive current from flowing into the first switching circuit.

12. The power supply as claimed in claim 5, wherein the first switching circuit comprises a bypass switch activated in response to the mode control signal.

13. The power supply as claimed in claim 6, wherein the first switching circuit comprises a bypass switch activated in response to the first or second mode control signal.

14. The power supply as claimed in claim 6, wherein the first switching circuit comprises a bypass switch activated in response to the first or second mode control signal.

15. The power supply as claimed in claim 12, wherein the first switching circuit further comprises a rectifier element connected to the bypass switch in series to rectify the second output power source output from the power converter.

16. The power supply as claimed in claim 13, wherein the first switching circuit further comprises a rectifier element connected to the bypass switch in series to rectify the second output power source output from the power converter.

17. The power supply as claimed in claim 14, wherein the first switching circuit further comprises a rectifier element connected to the bypass switch in series to rectify the second output power source output from the power converter.

18. The power supply as claimed in claim 12, wherein the bypass switch operates in a saturated region when operating in the standby mode, and operates in a linear region between the saturated regions when operating in the stable mode.

19. The power supply as claimed in claim 13, wherein the bypass switch operates in a saturated region when operating in the standby mode, and operates in a linear region between the saturated regions when operating in the stable mode.

20. The power supply as claimed in claim 14, wherein the bypass switch operates in a saturated region when operating in the standby mode, and operates in a linear region between the saturated regions when operating in the stable mode.

21. The power supply as claimed in claim 6, wherein the differential circuit generates the first mode control signal using a difference between the second output power source and the reference value.

22. The power supply as claimed in claim 21, wherein the differential circuit comprises a charge element to prevent excessive current from flowing into the first switching circuit.

23. A method of controlling power output in a power supply generating a first output power source and a second output power source in response to an external power supply and a power control signal, the method comprising:

rectifying and smoothing a first output power source and a second output power source, the first output power source and the second output power source being rectified and smoothed by first and second output parts, respectively;

using the rectified and smoothed first power output source to generate a control signal used by the power supply during conversion of the external power supply into the first and second output power sources; and controlling operating modes of the power supply based on the rectified and smoothed second output power source by using a second output controller to connect the first output part and the second output part, the second output controller including a first switching circuit with one end connected to the first output part and another end connected to the second output part.

24. A power, supply comprising:

a power converter to generate a first output power source and a second output power source in response to an external power source and a power control signal;

a first output part to rectify and smooth the first output power source;

a second output part to rectify and smooth the second output power source;

a first output controller to receive the rectified and smoothed first output power source from the first output part to generate the power control signal used at the power converter; and a second output controller to connect the first output part and the second output part, and to receive the rectified and smoothed second output power source from the power output part to control operating modes of the first output part and the second output part, wherein the second output controller comprises a differential circuit to receive the rectified and smoothed second output power source and to generate a first mode control signal to operate the first output part and the second output part in a stable mode in which the second output power source is output within an allowable error range with respect to a predetermined reference value of the second output power source, and a first switching circuit comprising a bypass switch activated in response to the first mode control signal.

25. The power supply as claimed in claim 24, wherein the operating modes comprise:

a normal mode, in which the second output power source is outputted with a level within an allowable error range with respect to a reference value; and a stable mode, in which the power output part is controlled to output the second output power source with a level within an allowable error range when a level of the second output power source exceeds the allowable error range.

26. The power supply as claimed in claim 24, wherein the operating modes comprise:

a normal mode, in which the second output power source is output with a level within the allowable error range with respect to the reference value; and a standby mode, in which the power output part is controlled so that a level of the second output power source decreases to reduce an amount of electric power consumed.

27. The power supply as claimed in claim 24, wherein the second output controller comprises a first switching circuit with one end connected to the first output part and another end is connected to the second output part.

28. The power supply as claimed in claim 27, wherein the first switching circuit is activated in response to the first mode control signal.

29. The power supply as claimed in claim 24, wherein the first switching circuit further comprises a rectifier element connected to the bypass switch in series to rectify the second output power source output from the power converter.

30. The power supply as claimed in claim 29, wherein the bypass switch operates in a saturated region when operating in standby mode, and operates in a linear region between the saturated regions when operating in stable mode.

31. The power supply as claimed in claim 28, wherein the differential circuit generates the mode control signal using a difference between the second output power source and the reference value.

32. The power supply as claimed in claim 31, wherein the differential circuit comprises a charge element to prevent excessive current from flowing into the first switching circuit.

* * * * *

UNITED STATES PATENT AND TRADEMARK OFFICE
CERTIFICATE OF CORRECTION

| | | |
|---|---|---|
| PATENT NO. | : 7,933,131 B2 | Page 1 of 1 |
| APPLICATION NO. | : 11/686422 | |
| DATED | : April 26, 2011 | |
| INVENTOR(S) | : Jun-seok Cho et al. | |

It is certified that error appears in the above-identified patent and that said Letters Patent is hereby corrected as shown below:

Column 14, Line 19, in Claim 24, delete "power," and insert -- power --, therefor.

Signed and Sealed this
Twenty-first Day of February, 2012

David J. Kappos
*Director of the United States Patent and Trademark Office*